United States Patent
Vijayaraghavan et al.

(10) Patent No.: US 7,573,870 B2
(45) Date of Patent: Aug. 11, 2009

(54) TRANSMIT PRIORITIZER CONTEXT PRIORITIZATION SCHEME

(75) Inventors: Divya Vijayaraghavan, Mountain View, CA (US); Curtis Ridgeway, Santa Cruz, CA (US)

(73) Assignee: LSI Logic Corporation, Milpitas, CA (US)

( * ) Notice: Subject to any disclaimer, the term of this patent is extended or adjusted under 35 U.S.C. 154(b) by 874 days.

(21) Appl. No.: 10/671,353

(22) Filed: Sep. 25, 2003

(65) Prior Publication Data
US 2005/0083942 A1    Apr. 21, 2005

(51) Int. Cl.
H04L 12/28    (2006.01)
(52) U.S. Cl. .............. 370/385.4; 370/401; 370/441; 709/206; 709/207
(58) Field of Classification Search ............ 370/394, 370/389, 412, 395.41
See application file for complete search history.

(56) References Cited

U.S. PATENT DOCUMENTS

| | | | | |
|---|---|---|---|---|
| 5,463,620 A | * | 10/1995 | Sriram | 370/412 |
| 5,774,453 A | * | 6/1998 | Fukano et al. | 370/231 |
| 5,970,088 A | * | 10/1999 | Chen | 375/222 |
| 6,502,189 B1 | * | 12/2002 | Westby | 713/1 |
| 7,092,401 B2 | * | 8/2006 | Craddock et al. | 370/412 |
| 2003/0056000 A1 | * | 3/2003 | Mullendore et al. | 709/236 |
| 2003/0142675 A1 | | 7/2003 | Mitchem et al. | 370/394 |
| 2003/0172123 A1 | * | 9/2003 | Polan et al. | 709/213 |
| 2003/0189935 A1 | * | 10/2003 | Warden et al. | 370/395.21 |
| 2004/0153564 A1 | * | 8/2004 | Lakkakorpi | 709/232 |
| 2008/0276018 A1 | * | 11/2008 | Hayter et al. | 710/62 |

* cited by examiner

*Primary Examiner*—Edan Orgad
*Assistant Examiner*—Mounir Moutaouakil
(74) *Attorney, Agent, or Firm*—Suiter Swantz pc llo

(57) ABSTRACT

A method and system prioritizes frames to be transmitted from a local node to a remote node on a Fibre Channel Arbitration Loop. The frames are placed in context queues. Each kind of context queue is assigned a priority. A determination of a set of transmit frame types is made. A user, an external device, or code may determine the number of transmit frame types in the set. A priority is assigned for each of the transmit frame types in the set. The transmit frame types may be determined by context type. The frames are prepared for transmission. The queues are examined by a suitable method to determine order of transmission. The transmit prioritizer preferably comprises five three-entry deep queues in which the prioritizer places valid contexts classified by transmit frame type. Queued contexts are selected for outgoing frame transmission by a prioritization algorithm aimed at saving the current fibre channel loop tenancy to maximize performance whenever possible. The context manager controls context storage and retrieval and the transmit prioritizer selects the context for which frame transfers will be performed.

20 Claims, 4 Drawing Sheets

TRANSMIT PRIORITIZER CONTEXT PRIORITIZATION SCHEME

FIELD OF THE INVENTION

The present invention generally relates to the field of high speed communications for storage devices and systems, and particularly to a method and system for high speed serial data transfer between systems and storage in a Fibre Channel Arbitrated Loop topology.

BACKGROUND OF THE INVENTION

Fibre Channel is a relatively inexpensive high speed communications technology that bidirectionally transfers information (e.g., Small Computer System Interface or SCSI information) between servers and disk arrays. In Fibre Channel, data is encapsulated into frames before being transmitted. A sequence includes multiple frames and an exchange includes multiple sequences. Fibre Channel may be implemented such that a collection of information (i.e., a context) is maintained about an exchange. A context is a collection of information or attributes such as a valid bit indicating if the exchange is valid, a transmit bit indicating if there is pending data to be encapsulated into frames and transmitted, and the like. There are multiple such contexts on-chip (in a cache) and off-chip and the context manager handles storage and retrieval of these contexts. The context manager provides contextual information to all the modules with the core link layer controller and functional layer. The context identifier is initially generated by the processor from the data in the header of the fibre channel frame. A context manager obtains the frame context for the context checker for use for checking. The context manager also determines when no valid exchange exists. The context manager manages the on and off chip contexts including context searches as well as on and off chip context swaps. The context manager communicates with and provides information to the other modules through the context identifier. The context manager module contains a table lookup submodule that maps the Context Identifier to the on-chip context.

Current Fibre Channel performance is lacking as illustrated by an existing approach. The existing approach for the point-to-point Fibre Channel switched topology prioritizes queued frames for transmission based on frame content and cumulative data time on the queue, but do not consider the following additional criteria that may be used to prolong loop tenancies in an arbitrated loop topology. These additional criteria include 1) prioritization of contexts with the lowest data direct memory access latency, 2) prioritization of contexts for the current node and loop from an on-chip context cache to minimize context retrieval latency, and 3) prioritization of contexts that have the ability to transfer to a different node in the same loop tenancy, bypassing the loop's arbitration process.

Therefore, it would be desirable to provide a method and system to maximize performance of a Fibre Channel device on an arbitrated loop by preserving the node's loop tenancy wherever possible, minimizing the number of arbitration requests from the device and the overhead associated with these requests.

SUMMARY OF THE INVENTION

Accordingly, the present invention is directed to a system and method for prioritizing frames according to frame type and/or for a Fibre Channel Arbitration Loop.

In a first aspect of the present invention, a method for prioritizing frames for transmission according to frame type includes determining if a remote node is open and, if the remote node is open, then determining if there are contexts for the remote node. If no contexts reside on the queues for the remote node, then an on-chip context cache is examined to determine a context for the remote node. If there are contexts in the on-chip context cache for the remote node, a cached context for the remote node is retrieved and queued. Then, a determination is made if there is context on the data queue for the remote node.

In a second aspect of the present invention, a system of communicatively coupled devices includes a plurality of devices. Each of the plurality of devices is communicatively coupled to all other devices of the plurality of devices in a loop topology, preferably, in a Fibre Channel Arbitration Loop topology. The system may include one or two loops. If there are two loops, then the data is permitted to flow across two paths to improve reliability. Prioritization is determined by the weighting of queues.

The present invention is directed to a method and system for prioritizing the context for frame transmission from multiple contexts so as to guarantee the best performance of the Fibre Channel device on the arbitrated loop. The present invention prolongs loop tenancies in Fibre Channel Arbitration Loop topologies through the prioritization of contexts.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
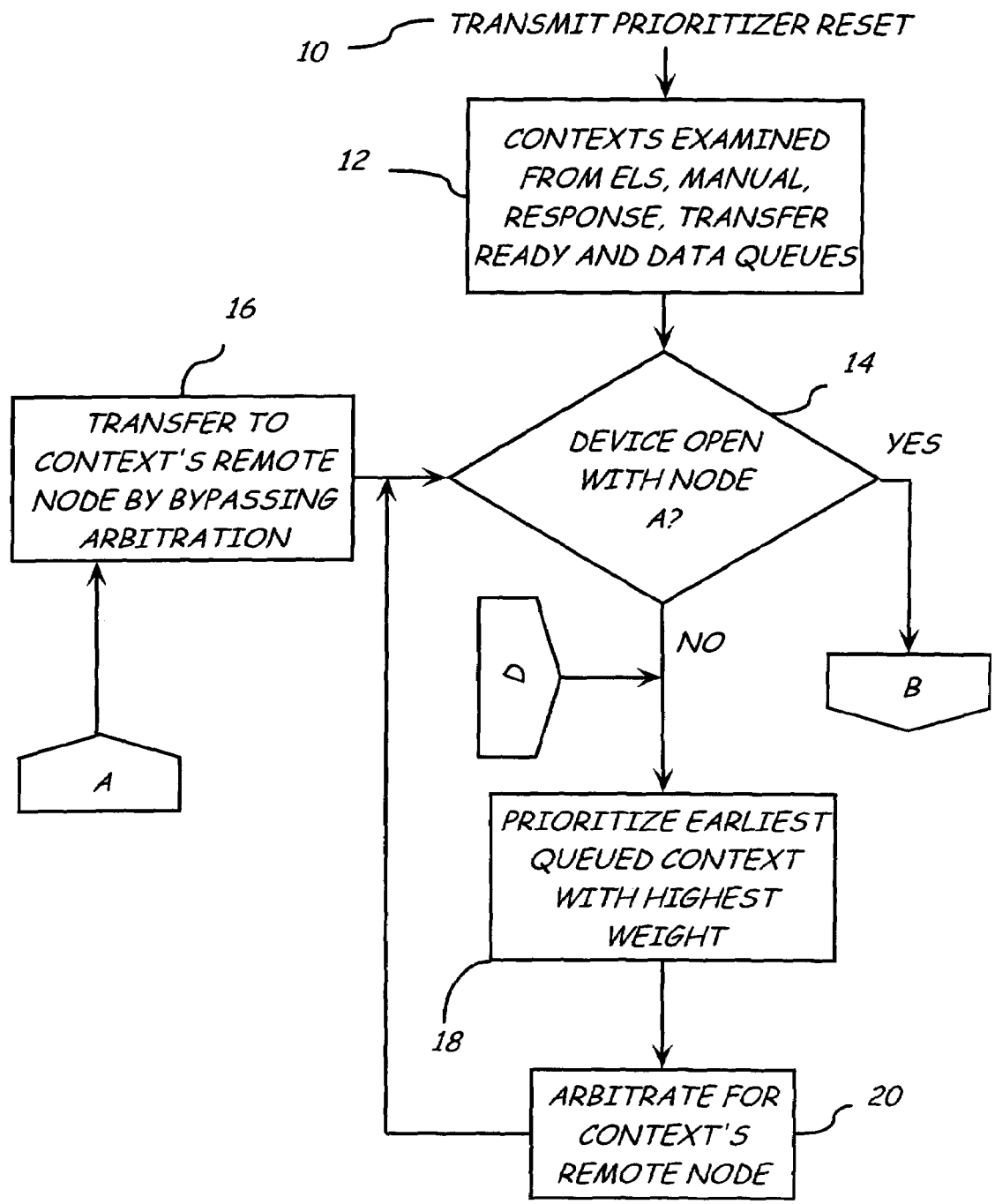
FIG. 1 illustrates an embodiment of a method of the present invention.
Figure 1:
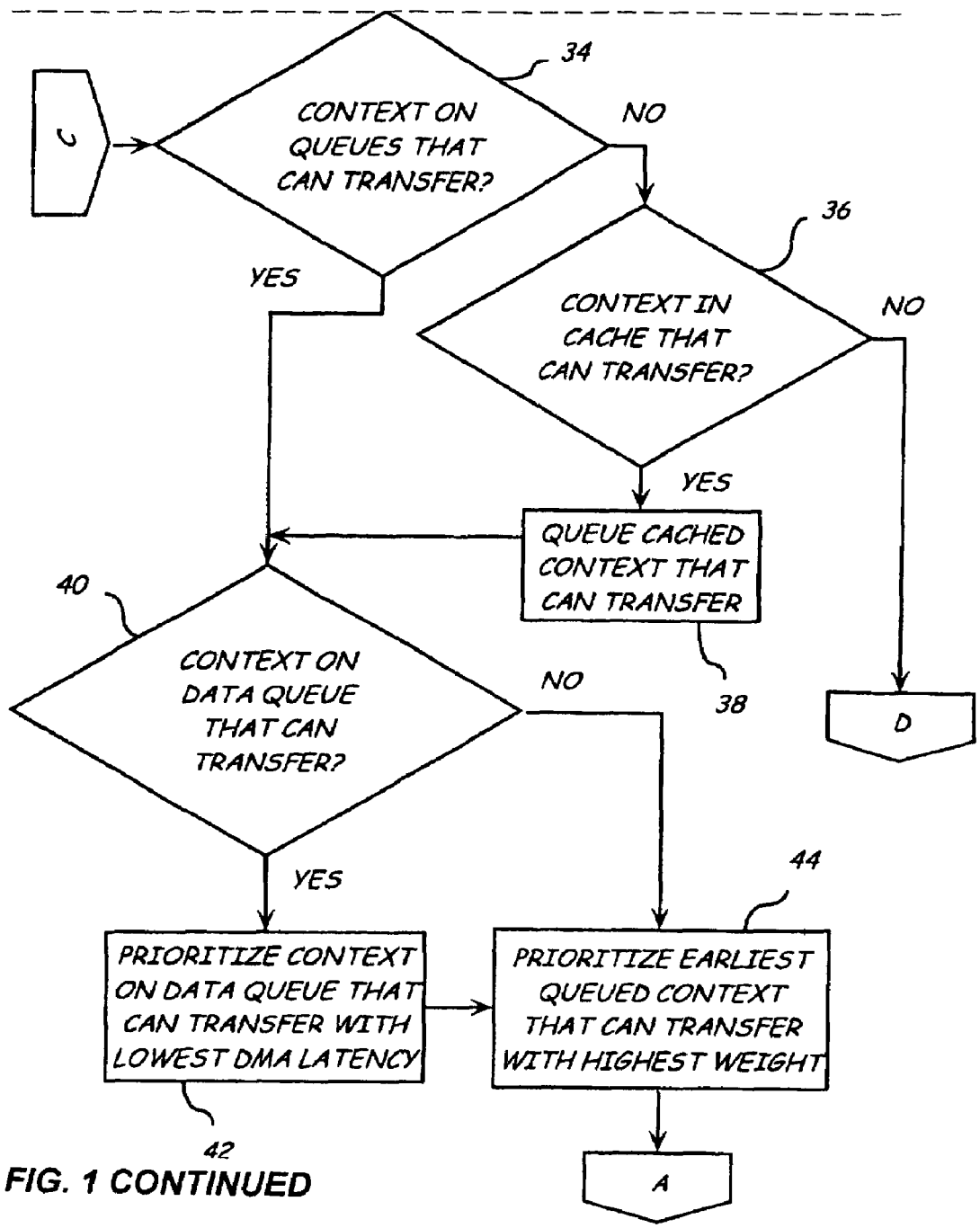

Reference will now be made in detail to the presently preferred embodiments of the invention, examples of which are illustrated in the accompanying drawings.

The present invention relates to a method and system for prioritizing frames to be exchanged between nodes on a Fibre Channel Arbitration Loop. Each node has one or more devices, such as servers and storage arrays. As used in this document, remote node refers to the node having the intended receiving device for receiving a transmitted exchange, sequence, or frame and local node refers to the node having a device that transmits that exchange, sequence, or frame. Multiple queues are used that correspond to different frame types that are to be prioritized. When a device is selected to receive information from a sending device, the sending device examines the queues maintained by the context manager for the receiving device. All exchanges to be sent to the receiving device are prioritized according to a prioritization scheme. The ability to transfer is an attribute of context, not a queue.

Each context contains a "transfer bit" which, when set, allows frames for that context to be transmitted to a second remote node without having to end the loop tenancy and arbitrate for the second remote node after frame transmission to the first remote node terminates.

Fibre Channel may be implemented such that a collection of information (i.e., a context) is maintained about an exchange and identified by a context ID. The queues in the invention are collections of valid context IDs, classified by context type. Time spent on a queue is one of the factors in the prioritization method, though the main differentiating factor of the prioritization method is the ability to prioritize contexts with the goal of saving loop tenancy and reducing arbitration overhead.

In the present invention, each node of the Fibre Channel Arbitration Loop includes a transmit prioritizer to maximize nodal performance on the arbitrated loop. The method of the present invention preferably is largely hardware-driven but may utilize programmable queue priorities to tailor itself towards various applications in which any node may function as an originator or responder. Although the present invention envisions the use of the transmit prioritizer in I/O controllers, the transmit prioritizer may be used in a variety of other applications as well. In an embodiment, the transmit prioritizer comprises five three-entry deep queues in which the prioritizer places valid contexts classified by transmit frame type. Queued contexts are selected for outgoing frame transmission by a prioritization algorithm aimed at saving the current fibre channel loop tenancy to maximize performance whenever possible. The context manager controls context storage and retrieval and the transmit prioritizer selects the context for which frame transfers will be performed. In an embodiment, the method of the present invention prioritizes frames for transmission for a fibre channel arbitrated loop. A determination of a set of transmit frame types is made. A user, an external device, or code may determine the number of transmit frame types in the set. A priority is assigned for each of the transmit frame types in the set. The transmit frame types may be determined by context type. The frames are prepared for transmission. The queues are examined by a suitable method to determine order of transmission.

The transmit prioritizer scans registers of context summary bits from which it determines if a context is valid and ready for frame transmission. When it encounters an indication of a valid context, it requests further information on the context from which it determines if the context is a candidate for queuing, classifies it by frame type and inserts it on its Extended Link Service (ELS), Manual, Response, Transfer Ready or Data queue. A prioritization weight is assigned to each transmit queue. Though this value is programmable, the default queue priority is (from highest to lowest) is ELS, Manual, Response, Transfer Ready, and Data. The transmit prioritizer examines valid contexts on all five queues (a maximum of fifteen contexts) simultaneously and prioritizes them as follows. If the Fibre Channel device is already open with a remote node, contexts intended for the same remote node on the same loop are examined first. Among these, the context that was queued first on the queue with the highest weight is prioritized. If no contexts reside on the queues for the current remote node and loop, the transmit prioritizer searches an on-chip context cache, bypassing the standard queuing mechanism, to determine if it can locate a context for the current remote node and loop in order to save the current loop tenancy. If multiple such contexts reside on the Data queue, the context with the lowest direct memory access (DMA) latency is prioritized. If the transmit prioritizer cannot locate a context for the current remote node and loop, it scans contexts (by queue weight and chronological order of queuing) to locate a candidate that has been enabled to transfer to a different remote node in the same loop tenancy, bypassing the arbitration process. If no such context exists on the transmit queues, the loop tenancy is ended and the context that was queued earliest on the highest weight queue is prioritized. If the fibre channel device is not open with a remote node, the loop tenancy is ended and the context that was queued earliest on the highest weight queue is prioritized to prioritize a context and arbitrate for and open the corresponding remote node.

Following the flow chart of FIG. 1, the transmit prioritizer of a device on the local node is reset or cleared 10. Any contexts in the ELS (extended link service), manual, response, transfer ready, and data queues of the device are examined 12. A remote node may have a single device or multiple devices attached to a Fibre Channel Arbitration Loop. A desired device on a remote node or the remote node itself may be referenced by the sending node. A determination is made as to whether a remote node is open 14. If not, then the earliest queued context with the highest weight is prioritized 18 and an arbitration request is made for this remote node 20. If the desired device is open, a determination is made as to whether context exists on the queues for the desired device 22. If so, processing proceeds to step 28. If not, a determination is made as to whether the context is in cache memory for the device 24. If so, then a determination is made as to whether there is context on the data queue for the device 28. If so, then the context on the data queue is prioritized for lowest direct memory access latency on the desired remote node 30 and processing proceeds to step 32. Otherwise, the earliest queued context with the highest weight is prioritized for the node 32, skipping step 30. If it is determined that there is no context in the on-chip cache for the device 24, then a determination is made as to whether there is context on the queues that can transfer 34. If not, then a determination is made as to whether there is context in the on-chip cache that can transfer 36. If not, processing proceeds to step 18. Otherwise, if there is context in cache for the device 24, then the cached context is queued for the device 26 and a determination is made as to whether there is context on the data queue for the device 28. If there is context on the data queue for the device 28, then the context on the data queue with the lowest direct memory access latency is prioritized 30. After step 30 or if the determination in step 28 is negative, the earliest queued context with the highest weight for the device is prioritized 32. If there is context on queues that can transfer 34 or if there is context in cache for the device that can transfer 36, then a determination is made as to whether there is context on the data queue that can transfer 40. After step 36 and before step 40, the cached context that can transfer is queued. If in step 40, it is determined that the context on the data queue can transfer, then context on the data queue with the lowest direct memory access latency is prioritized 42. Then, after step 42 or if the context on the data queue cannot transfer 40, the earliest queued context that can transfer with the highest weight is prioritized 44. Processing then proceeds to step 16 in which the remote node transfers to the context's remote node without arbitration and processing proceeds to step 14.

Variations of the method of the present invention are contemplated. Although the present invention has been described as using five queues, a fewer or greater number of queues may be used. For example, the command queue may be incorporated into the prioritization method. As another example, the queues may be limited to three or four, such as a group consisting only of ELS, response, and data. A weighting relationship may be used in conjunction with or as an alternative to the multiple queue usage. For example, all entries for a device (i.e., node) may be assigned a priority value based on an equation such as priority_value=A*priority_type+B*time_of_entry, where A and B are fixed constants or are variables that may be set by the software, an external device, or a user to provide a weighting factor. Queues may be merged together such that, for example, response and transfer ready may be grouped together in the same queue. Although the present invention has described three deep queues, queue depth may be set at two, four, five, or more and the queues may have differing maximum numbers of entries.

Figure 2:
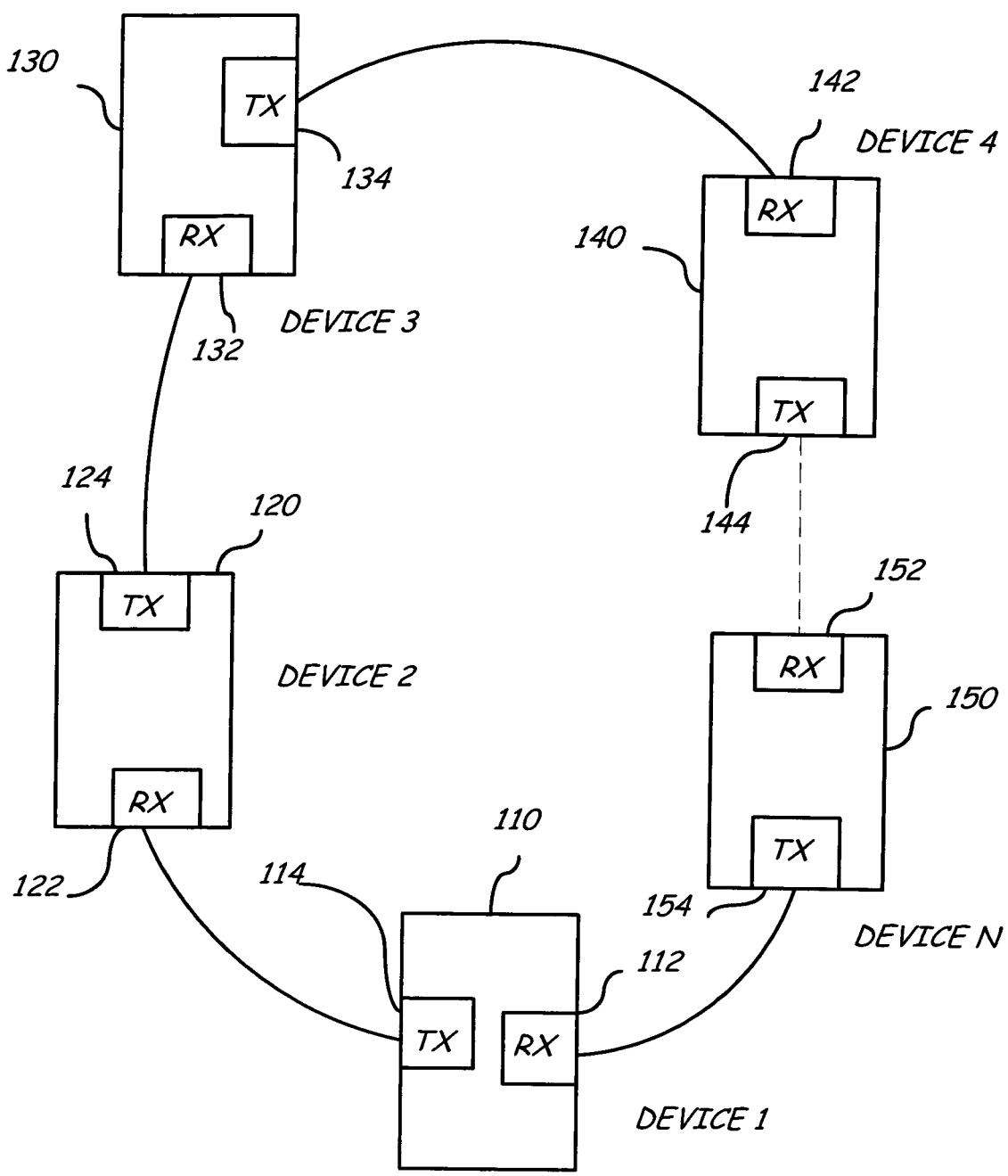
FIG. 2 illustrates an embodiment of a system of the present invention.

FIG. 2 illustrates an embodiment of Fibre Channel Arbitration Loop that incorporates the method of the present invention. The fibre channel arbitrated loop is a loop interconnection topology that allows up to 126 participating node ports to communicate with one another without the need of a fabric switch. The Fibre Channel Arbitration Loop is a fully blocking connection topology that allows a single connection between one pair of ports at any point in time. FIG. 2 shows N devices 110, 120, 130, 140, 150 (i.e., node ports) in which each device has a receive port 112, 122, 132, 142, 152 and a transmit port 114, 124, 134, 144, 154. In a Fibre Channel Arbitration Loop, a group of devices are interconnected such that a second device may receive from a first device and transmit to a third device so that a set of such devices forms a functional loop. The arbitrated loop configuration is created by separating out the transmit and receive fibres associated with each port and connecting the transmit output of one port to the receive output of the next port in a predetermined order. As shown in FIG. 2, the receive port 112 of device 1 110 receives information transmitted from the transmit port 154 of device N 150 and the transmit port 114 of device 1 110 provides information to the receive port 122 of device 2 120. In a similar manner, each device is communicatively coupled to a device that transmits to it and a deceive that receives so that information may circulate in a circular path from one device to the next until the destination device is reached. The devices interconnect through intelligent ports that manage protocols between devices to transmit frames of information, status, and instructions.

Figure 3:
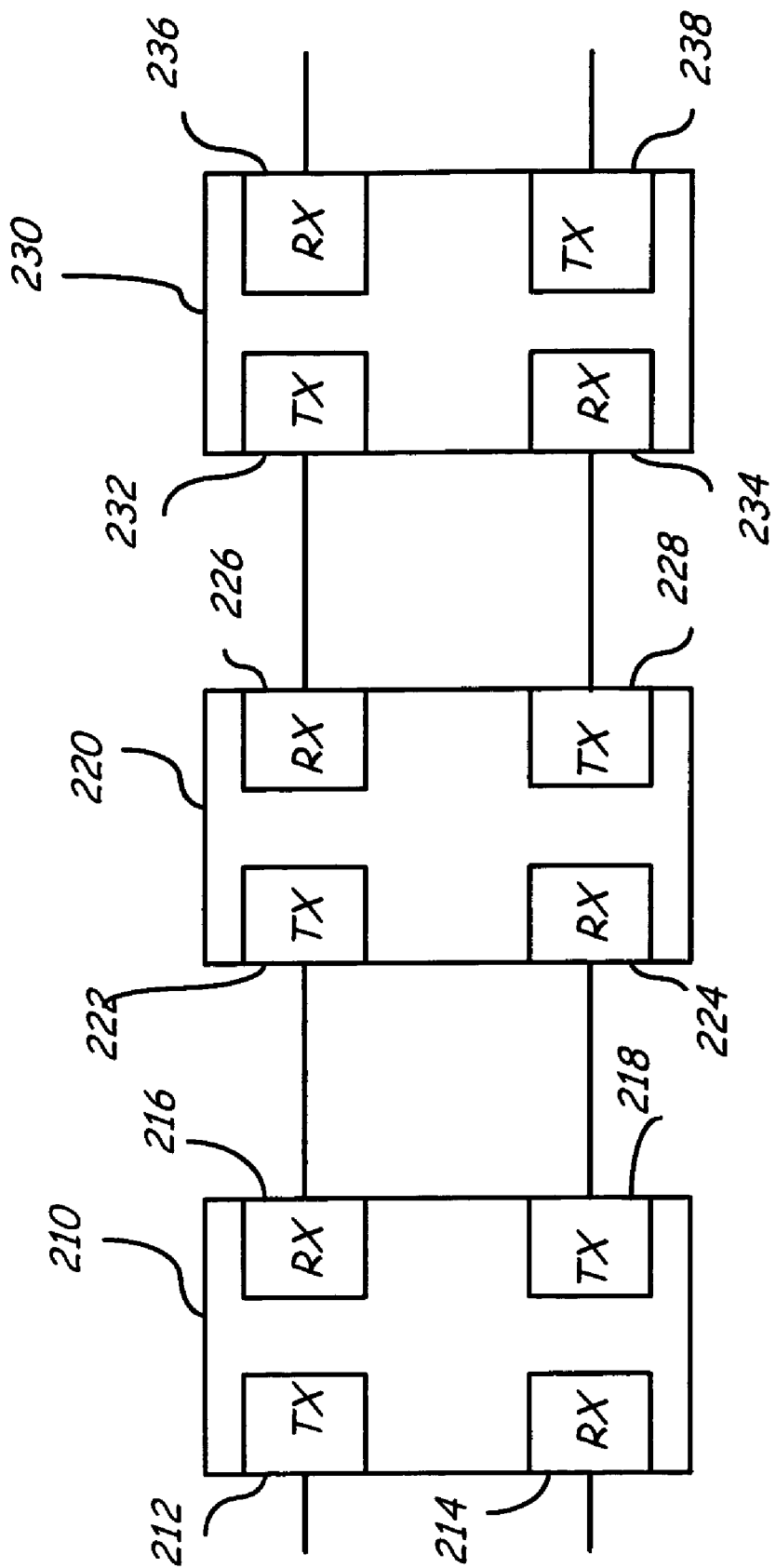
FIG. 3 illustrates an alternate embodiment of a portion of system of the present invention.

FIG. 3 illustrates a dual loop configuration of three devices in a Fibre Channel Arbitration Loop. In the first loop, a signal passing through the three devices 210, 220, 230 passes into the receive port 236 of device 230, passes from the transmit port 232 to the receive port 226 of device 220, passes from the transmit port 222 to the receive port 216 of device 210, and passes out of the transmit port 212. In the second loop, transmission occurs in the reverse order: receive port 214, transmit port 218, receive port 224, transmit port 228, receive port 234, and transmit port 238.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages, the form hereinbefore described being merely an explanatory embodiment thereof. It is the intention of the following claims to encompass and include such changes.

What is claimed is:

1. A method for prioritizing frames, via a transmit prioritizer, for transmission from a local node according to frame type, comprising:

determining if a remote node is open;
if the remote node is open, then determining if there are contexts for the remote node in which the contexts are arranged in a plurality of queues, one queue included in the plurality of queues being both a response queue and a transfer ready queue;
if no contexts reside on the queues for the remote node, then examining an on-chip context cache to determine a context for the remote node when the remote node is a current remote node of a current loop, thereby promoting saving of a current loop tenancy;
if there are contexts in the on-chip context cache for the remote node, then retrieving and queuing cached context for the remote node;
determining if there is context on a data queue for the remote node;
if there is context on the data queue for the remote node, then prioritizing context on the data queue for the lowest direct memory access latency for the remote node; and
prioritizing an earliest queued context for the remote node with the highest weight via equation: priority value=A*priority type+B*time of entry, wherein A and B are at least one of: fixed constants; and variables, said fixed constants and variables being configured for being established via at least one of: software, an external device, and a user to provide a weighing factor,
wherein the remote node is a device on a Fibre Channel Arbitration Loop.

2. The method of claim 1, further comprising, if there is no context on the data queue for the remote node, then prioritizing an earliest queued context for the remote node with the highest weight.

3. The method of claim 1, wherein the method is performed by another device on the Fibre Channel Arbitration Loop.

4. The method of claim 3, wherein the contexts are arranged in a third queue.

5. The method of claim 4, wherein each of the first, second, and third queues stores a unique type of frame.

6. The method of claim 5, wherein the contexts are arranged in fourth and fifth queues.

7. The method of claim 6, wherein the first, second, third, fourth, and fifth queues are extended link service, manual, response, transfer ready, and data, respectively.

8. The method of claim 7, wherein the first queue has a higher priority than the second queue and the second queue has a higher priority than the third queue.

9. A system of communicatively coupled devices, comprising:

a plurality of nodes, each of the plurality of nodes communicatively coupled to all other nodes of the plurality of nodes in a loop topology, each of the plurality of nodes capable of receiving information from every other node of the plurality of nodes and capable of transmitting information to every other node of the plurality of nodes per loop, such that no two nodes transmit to a same node in a loop, wherein communications between nodes uses multiple queues to determine priority for transmitting frames of information, wherein a node included in the plurality of nodes includes on-chip cache configured for storing contexts and further configured for being examined for contexts when no contexts reside on the multiple queues for a current remote node and current loop, thereby promoting saving of a current loop tenancy, wherein a queue included in the multiple queues is both a response queue and a transfer ready queue, the system being configured for prioritizing an earliest queued context for the remote node with the highest weight via equation: priority value=A*priority type+B*time of entry, wherein A and B are at least one of: fixed constants: and variables, said fixed constants and variables being configured for being established via at least one of: software, an external device, and a user to provide a weighing factor.

10. The system of communicatively coupled devices of claim 9, wherein the loop topology is a Fibre Channel Arbitration Loop.

11. The system of claim 9, wherein the multiple queues include a response queue.

12. The system of claim 11, wherein the multiple queues include an extended link service queue.

13. The system of claim 12, wherein the multiple queues include a transfer ready queue.

14. The system of claim 13, wherein the multiple queues include a manual queue.

15. The system of claim 14, wherein the multiple queues include a data queue.

16. The system of claim 15, wherein the multiple queues include a command queue.

17. The system of claim 9, wherein the plurality of nodes are two to 126 in number.

18. The system of claim 9, wherein the plurality of nodes are in a dual loop arrangement such that each node receives and transmits information to each of two nodes through two loops in which information flows in opposite directions.

19. The system of claim 9, wherein a node corresponds to one device.

20. The system of claim 9, wherein a node corresponds to a plurality of devices.

* * * * *